(12) United States Patent
Basu et al.

(10) Patent No.: US 6,609,094 B1
(45) Date of Patent: Aug. 19, 2003

(54) MAXIMUM ENTROPY AND MAXIMUM LIKELIHOOD CRITERIA FOR FEATURE SELECTION FROM MULTIVARIATE DATA

(75) Inventors: Sankar Basu, Tenafly, NJ (US); Charles A. Micchelli, Mohegan Lake, NY (US); Peder Olsen, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/576,429

(22) Filed: May 22, 2000

(51) Int. Cl.[7] .............................................. G10L 15/08
(52) U.S. Cl. ........................ 704/240; 704/239; 704/254
(58) Field of Search ................................. 704/239, 240, 704/254

(56) References Cited

U.S. PATENT DOCUMENTS

| | | | | |
|---|---|---|---|---|
| 5,615,299 A | * | 3/1997 | Bahl et al. .................. | 704/254 |
| 5,764,853 A | | 6/1998 | Watari et al. | |
| 5,865,626 A | * | 2/1999 | Beattie et al. .............. | 434/185 |
| 6,073,099 A | * | 6/2000 | Sabourin et al. ............ | 704/256 |
| 6,141,644 A | * | 10/2000 | Kuhn et al. .................. | 704/273 |
| 6,374,216 B1 | * | 4/2002 | Micchelli et al. ........... | 704/236 |

OTHER PUBLICATIONS

C. Miller and Roger Horn, Probability density estimation using entropy maximization, Neural Computation, vol. 10, pp. 1925–1938, 1998.*

* cited by examiner

*Primary Examiner*—Richemond Dorvil
*Assistant Examiner*—Kinari Patel
(74) *Attorney, Agent, or Firm*—Whitham, Curtis & Christofferson, P.C.; Stephen C. Kaufman

(57) ABSTRACT

Improvements in speech recognition systems are achieved by considering projections of the high dimensional data on lower dimensional subspaces, subsequently by estimating the univariate probability densities via known univariate techniques, and then by reconstructing the density in the original higher dimensional space from the collection of univariate densities so obtained. The reconstructed density is by no means unique unless further restrictions on the estimated density are imposed. The variety of choices of candidate univariate densities as well as the choices of subspaces on which to project the data including their number further add to this non-uniqueness. Probability density functions are then considered that maximize certain optimality criterion as a solution to this problem. Specifically, those probability density function's that either maximize the entropy functional, or alternatively, the likelihood associated with the data are considered.

9 Claims, 4 Drawing Sheets

MAXIMUM ENTROPY AND MAXIMUM LIKELIHOOD CRITERIA FOR FEATURE SELECTION FROM MULTIVARIATE DATA

BACKGROUND OF THE INVENTION

1. Field of the Invention

The present invention generally relates to speech recognition systems and, more particularly, to the reconstructing of high dimensional density feature sets from lower dimensional projections and the use of maximum entropy and maximum likelihood criterion to optimize the directions of projection to improve the performance of such systems.

2. Background Description

The basic problem of speech recognition is the identification of sequences of words from a prescribed vocabulary corresponding to spoken utterances. Each word in the vocabulary can be thought of as a sequence of basic sounds, consisting of an alphabet of about fifty sounds (called "phonemes"). Therefore, the goal of speech recognition is to model the speech signal for each basic sound in such a way that it is possible to identify them by observing the sampled speech signal. Due to inherent redundancies in the acoustic signal a parsimonious representation is achieved by extracting feature vectors periodically (every 10 ms). The feature vectors should be related to the local spectral content of the speech signal, and should preserve the information necessary to enable discrimination between different phonemes. Furthermore, the acoustic features associated with a phoneme depend on a multitude of circumstances surrounding its formation (realization).

An important step in the speech recognition process is to isolate important features of the waveform over small time intervals (typically 25 ms). These features are represented by vector $x \in R^d$ (where d usually is 39) which are then identified with context dependent sounds. Strings of such basic sounds are then converted into words using a dictionary of acoustic representations of words. In an ideal situation the feature vectors generated by the speech waveform would be converted into a string of phonemes corresponding to the spoken utterance.

A problem associated with this process is to identify a phoneme label for an individual acoustic vector x. Training data is provided for the purpose of classifying a given acoustic vector. A standard approach for classification in speech recognition is to generate initial "prototypes" by K-means clustering and then to refine them by using the EM algorithm based on mixture models of gaussian densities. See, for example, Frederick Jelenik, *Statistical Methods for Speech Recognition*, MIT Press (1997). Moreover, in the decoding stage of speech recognition the output probability density functions are most commonly assumed to be a mixture of Gaussian density functions.

Density estimation of high dimensional data arises in speech recognition via classification of the training data. Specifically, acoustic vectors for a given sound are viewed as a random variable whose density is estimated from the data. Consequently, the training stage requires that densities be found for all basic sounds. From this information we can assign to any acoustic vector the phoneme label corresponding to the highest likelihood obtained from these probability densities. This information is the basis of the translation of acoustic vectors into text.

Speech data is characteristically represented by high dimensional vectors and each basic sound has several thousand data vectors to model it (typically, 3000 to 5000 for each of approximately 3500 basic sounds). Purely Gaussian densities have been known to be inadequate for this purpose due to the heavy tailed distributions observed by speech feature vectors. As an intended remedy to this problem, practically all speech recognition systems attempt modeling by using a mixture model with Gaussian densities for mixture components. Variants of the standard K-means clustering algorithm are used for this purpose. The classical version of the K-means algorithm can also be viewed as an special case of the EM algorithm (cf., David W. Scott, *Multivariate Density Estimation*, Wiley Interscience (1992)) for mixtures of Gaussians with variances tending to zero. Attempts to model the phonetic units in speech with non-Gaussian mixture densities are described by S. Basu and C. A. Micchelli, in "Parametric Density Estimation for the Classification of Acoustic Feature Vectors in Speech Recognition, *Nonlinear Modeling: Advanced Black-Box Techniques*, Eds. J. A. K. Suykens and J. Vandewalle, pp. 87–118, Kluwer Academic Publishers, Boston (1998).

There exists a large literature on estimating probability densities associated with univariate data. However, corresponding methods for estimating multivariate probability densities prove to be problematic due to various reasons. See again David W. Scott, *Multivariate Density Estimation*, Wiley Interscience (1992). This is especially true in the context of very high dimensions. Crucial among these difficulties is the fact that the data appears to be increasingly sparse with the increase in the number of dimensions.

SUMMARY OF THE INVENTION

It is therefore an object of the present invention to provide improvements in speech recognition systems.

Recognizing that acoustic vectors are important instances of high dimensional statistical data for which feature recognition can enhance the performance of density estimation in classification and training, we approach the problem by considering projections of the high dimensional data on lower dimensional subspaces, say a single dimensional subspace, subsequently by estimating the univariate probability densities via known univariate techniques, and then by reconstructing the density in the original higher dimensional space from the collection of univariate densities so obtained. In some sense the approach is reminiscent of function reconstruction from projections (e.g., in computerized tomography). The reconstructed density is by no means unique unless further restrictions on the estimated density are imposed. The variety of choices of candidate univariate densities as well as the choices of subspaces on which to project the data including their number further add to this non-uniqueness. One can then consider probability density functions that maximize certain optimality criterion as a solution to this problem. For the purpose of the present invention, we consider those probability density functions that either maximize the entropy functional, or alternatively, the likelihood associated with the data.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Maximum Entropy From Marginals

Figure 1:
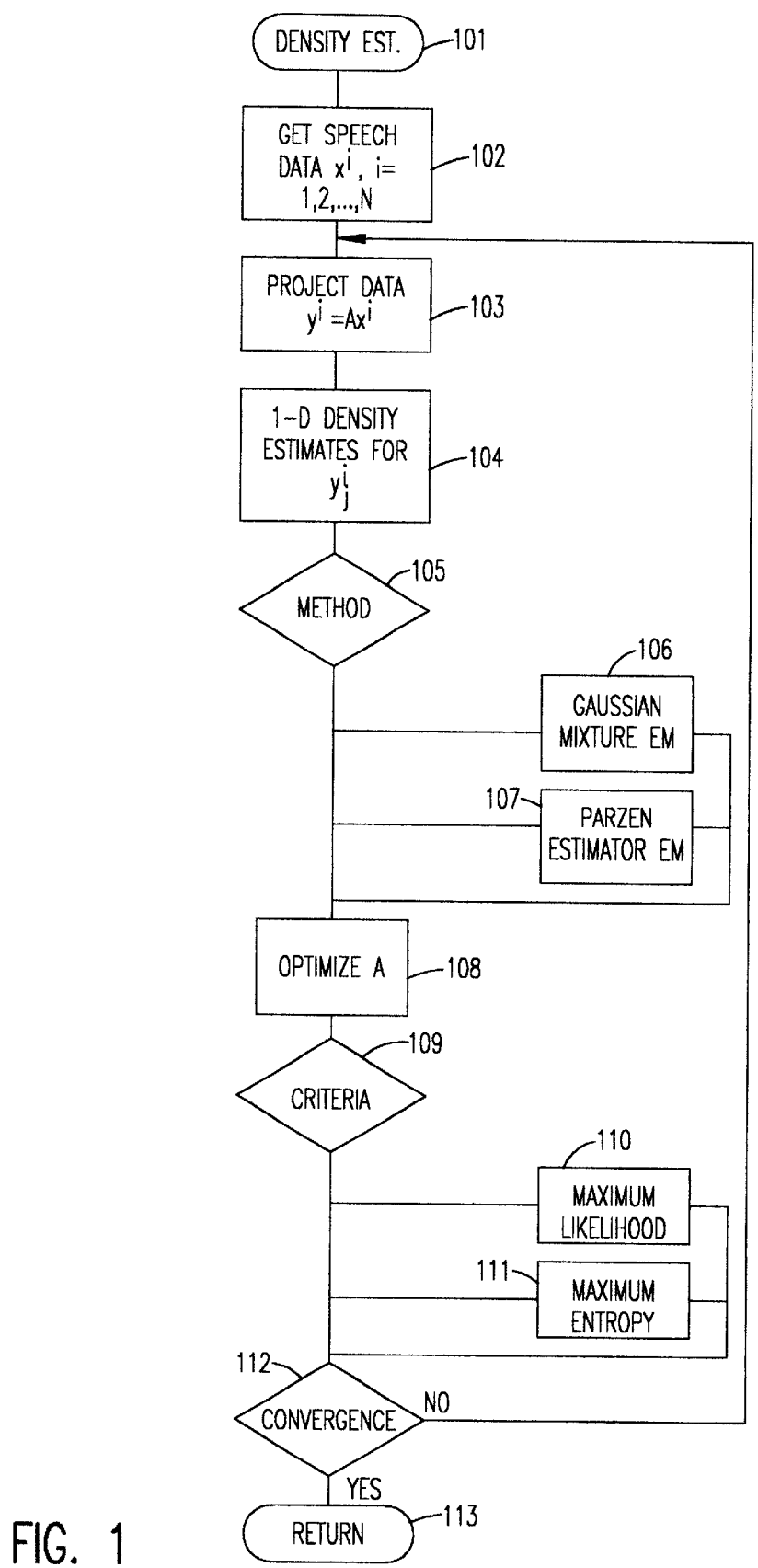
FIG. 1 is a flow diagram illustrating the process of estimating densities of high dimensional speech data.

In this section we compute the maximum of the entropy of a probability density function on $R^d$ with prescribed marginals in d linearly independent (column) vectors, $y^1, y^2, \ldots, y^d \in R^d$. Let Y be the d×d matrix whose columns are these vectors. Thus, we are given univariate probability density functions, $p_1, p_2, \ldots, p_d$ and consider all multivariate probability density functions P: $R^d \to R$ such that for all measurable function $f$ on R with $f \cdot p_1, f \cdot p_2, \ldots, f \cdot p_d \in C(R)$ (the space of absolutely integrable functions on R) we have that $$\int_{R^d} f(y_i^T x) P(x) dx = \int_{R^d} f(t) p_i(t) dt, \; i = 1, 2, \ldots, d. \quad (1)$$

We denote the class of all densities P satisfying the above equations by C(p). Recall that the entropy of P is given by $$H(P) = -\int_{R^d} P(x) \log P(x) dx. \quad (2)$$

See I. M. Cover and J. A. Thomas, *Elements of Information Theory*, John Wiley & Sons, Inc. (1991). Our first observation computes the maximum of H(P) for all $P \in C(p)$.

Theorem 1: Given any probability density functions $p_1, p_2, \ldots, p_d$ on R such that for $i=1, 2, \ldots, d$, $p_i \log p_i \in L(R)$, we have that $$\max\{H(P) : P \in C(p)\} = -\frac{1}{2} \log \det G + \sum_{i=1}^{d} H(p_i), \quad (3)$$

where $G = Y^T Y$ is the Gram matrix $$G(Y) = [y_i^T y_j] \; i, j = 1, \ldots, d. \quad (4)$$

Moreover, $$P^*(x) = \sqrt{\det G(Y)} \prod_{i=1}^{d} p_i(y_i^T x), \; x \in R^d \quad (5)$$

is the unique probability density function in C(p) at which the maximum in equation (3) is achieved.

In the next section we shall use this observation for maximum entropy based methods for feature selection of data.

Feature Selection Using Maximum Entropy

Our goal in this section is to use Theorem 1 as a means to isolate desirable features of multivariate data. Thus, our point of view here is to take observed data $x=(x^1, x^2, \ldots, x^N)^T \in R^N$ considered to be samples of some unknown probability function P. We project this data onto d directions, estimate the probability density function of the univariate data, find the maximum entropy of all multivariate probability density functions in $R^d$ with marginals in these directions prescribed by the estimated univariate probability density functions and then maximize the entropy further over the choice of these directions. This strategy for optimal feature selection depends on the method used to estimate univariate data.

Thus, for univariate data $x=(x_1, x_2, \ldots, x_N)^T \in R^N$, we suppose $p(\cdot; x)$ is a probability density function on R, which is a good estimator for the random variable from which x is drawn. For a given $y \in R^d$ of norm one, we form the vector of univariate data $X^T y \in R^N$ where X is the d×N matrix whose columns are the multivariate data $x^1, x^2, \ldots, x^N$ and use $p(\cdot; X^T y)$ as an estimate for the marginal probability density function of P in the direction y. Given d directions $y^1, y^2, \ldots, y^d$ following Theorem 1, our maximum entropy estimator for the unknown probability density function P is $$P^*(x) = \sqrt{\det G(Y)} \prod_{i=1}^{d} p_i(y_i^T x; X^T y_j), \; x \in R^d, \; x \in R^d, \quad (6)$$

and $$\mathcal{F}(Y) := H(P^*) = \frac{1}{2} \log \det G(Y) + \sum_{i=1}^{d} \mathcal{H}(y_i), \quad (7)$$

where we define $$H(y) = H(p(\cdot; X^T y)), \; y \in R^d \quad (8)$$

We desire to make the entropy equation (7) as large as possible by varying our choice of vectors $y^1, y^2, \ldots, y^d$. This is not fruitful without additional constraints on the vectors $y^1, y^2, \ldots, y^d$. Indeed, we can have independent vectors which are nearly dependent so that their Gram matrix is nearly singular and so the first term in equation (7) will become large. Our preference is to choose an orthonormal basis so that the corresponding Gram matrix is the identity matrix. We turn to an example of the above which is instructive. Specifically, we have in mind as our univariate estimate for the data vector $x=(x_1, x_2, \ldots, x_N)^T \in R^N$ the Gaussian density $G(\cdot; \mu(x), \sigma(x))$, where $$G(t; \mu, \sigma) = \frac{1}{\sqrt{2\pi\sigma}} e^{-\frac{(t-\mu)^2}{2\sigma}}, \; t \in R, \quad (9)$$

with mean $$\mu(x) = \frac{1}{N} \sum_{j=1}^{N} x_j \quad (10)$$

and variance $$\sigma(x) = \frac{1}{N} \sum_{j=1}^{N} (x_j - \mu)^2. \quad (11)$$

Thus, we have that $H(G(\cdot; \mu, \sigma)) = \frac{1}{2} \log(2\pi e \sigma)$ and the function that we shall optimize is $$\mathcal{F}(y) = -\frac{1}{2}\log\det G(Y) + \frac{d}{2}\log(2\pi e) + \frac{1}{2}\sum_{j=1}^{d}\log y_j^T V y_j, \quad (12)$$

where V is the d×d matrix $V=UU^T$ and U is the d×N matrix whose columns are the vectors $$u_j = \frac{1}{\sqrt{N}}(x^j - \bar{x}), \quad j=1, 2, \ldots, N \quad (13)$$

where $$\bar{x} = \frac{1}{N}\sum_{i=1}^{N} x^i. \quad (14)$$

First, we consider the minimum of $F_G(Y)$ over all d×d orthogonal matrices Y. To this end, we introduce the d×d matrix $W=Y^T V Y$, whose elements are given as $$\omega_{ij} := \langle y^i, V y^j \rangle, \quad i,j=1, 2, \ldots, d.$$

Since det W=det G det V, we conclude that $$\mathcal{F}_G(Y) = \frac{d}{2}\log(2\pi e) + \frac{1}{2}\log\det V + \frac{1}{2}\log\left(\prod_{j=1}^{d}\omega_{jj}\right) - \frac{1}{2}\log\det W.$$

Recall from Hadamard's inequality that det $$W \leq \prod_{j=1}^{d} \omega_{jj}$$

where equality occurs if and only if $\omega_{ij}=0$ for all i≠j, i,j=1, 2, . . . , d. Thus, we obtain that $$F_G(Y) \geq d/2\log(2\pi e) + \frac{1}{2}\log\det V.$$

Moreover, equality occurs if and only if $$\langle y^i, V y^j \rangle = 0, \, i \neq j, \, 1,j=1, 2, \ldots, d.$$

We suppose that $v_1, v_2, \ldots, v_d$ are orthonormal eigenvectors corresponding to eigenvalues $\lambda_1, \lambda_2, \ldots, \lambda_d$ with $0 \leq \lambda_1 \leq \lambda_2 \leq \ldots \leq \lambda_d$ for V. We let $$\Lambda = \text{diag}[\lambda_1, \lambda_2, \ldots, \lambda_d]$$

and S be the orthogonal d×d matrix whose columns are $v^1$, $v^2, \ldots, v^d$, i.e., $V=S^T \Lambda S$. We then have that $$\min\{\mathcal{F}_G(Y) : Y\} = \mathcal{F}_G(S) = \frac{1}{2}d\log(2\pi e) + \frac{1}{2}\sum_{j=1}^{d}\log\lambda_j.$$

Note that we have demonstrated that there exist orthonormal vectors at which the minimum is attained.

Let us now consider the problem of maximizing the function $F_G$ over all d×d matrices Y which are orthogonal. In this case, we have from equation (12) that $$\mathcal{F}_G(Y) = \frac{d}{2}\log(2\pi e) + \frac{1}{2}\sum_{j=1}^{d}\log\langle y^j, V y^j \rangle$$

and by the concavity of the log function obtain the inequality $$\mathcal{F}_G(Y) \leq \frac{d}{2}\log 2\frac{\pi_l}{d} + \frac{d}{2}\log\sum_{j=1}^{d}d\lambda_j \quad (15)$$

where equality holds if, for all j=1, 2, . . . , d, $$\langle y^j, V y^j \rangle = \frac{1}{d}\sum_{i=1}^{d}\lambda_i. \quad (16)$$

In other words, the matrix W has constant diagonal elements. To ensure that the bound in inequality (15) is sharp, we need to establish the existence of an orthogonal matrix Y such that equation (16) is satisfied. Our first observation in this regard is the following fact. Suppose H is a d×d Hadamard matrix; that is, all the entries of H are either 1 or −1 and satisfies the condition that $$HH^T = dI.$$

We set $J=d^{-\frac{1}{2}}H$ and $Y=SJ$ so that Y is orthonormal. Since $V=S\Lambda S^T$, we have, for i=1, 2, . . . , d that $$\langle y^j, V y^j \rangle = \sum_{j=1}^{d} J_{ij}^2 \lambda_j = \frac{1}{d}\sum_{j=1}^{d}\lambda_j.$$

which is the desired equation (16). Hadamard matrices do not exist for all orders. When they do exist, the above remark tells us how to construct an orthonormal matrix from the eigenvalues of V which maximizes the function $F_G$.

Feature Selection Using Maximum Entropy and Mixtures of Gaussians

Often one finds modeling univariate data by a single Gaussian to be inadequate. We, therefore, consider a mixture model of m Gaussians $$p(t \mid \mu, \omega, \sigma) = \sum_{j=1}^{m}\omega_j G(t; \mu_j, \sigma_j), \, t \in R, \quad (18)$$

where the mixture weights satisfy the constraints $$\sum_{j=1}^{m}\omega_j = 1, \omega_i > 0; i = 1, 2, \ldots, m. \quad (19)$$

For any choice of paramters $\mu$, $\omega$ and $\sigma$, the entropy of the probability density of equation (18) can easily be computed by a Monte-Carlo method using random samples drawn from this probability density function.

We turn to the problem of selecting the means and variances of the probability density function in equation (18) from a given but arbitrary data vector $(x_1, x_2, \ldots, x_N)^T \in R^N$. As before, we take an MLE (maximum likelihood estimation) approach. However, as is well known for m>2 the likelihood function will not have a maximum. See, for example, V. N. Vapnik, *The Nature of Statistical Learning*

*Theory*, Springer Verlag (1995). Instead, we cannot use it as an absolute criterion to select the means and variances. Therefore, we turn to the EM algorithm to iteratively set the means and variances. Here we fix a number of iterations in the EM update formulas appearing below independent of the data vector x. The first step is the initialization of the means and variances. This is done by clustering the data vector into m groups of (approximately) equal size starting with its first coordinate and proceeding sequentially through all its components. On each of the m clusters we use the formulas (10) and (11) for the mean and the variances. We then update them by the EM formulas, (see, for instance, C. M. Bishop, *Neural Networks for Pattern Recognition*, Clarendon Press, Oxford (1995), and A. P. Dempster, N. M. Laird and D. B. Baum, "Maximum likelihood from incomplete data via the EM algorithm", *Journal of Royal Statistical Soc.*, Ser. B. vol. 39, pp. 1–38, 1977), which produces a sequence of MLE's whose likelihoods are nondecreasing. One step of the update formulas is given by $$\hat{\omega}_j = \frac{1}{N} \sum_{i=1}^{N} P_{ij}, \; j = 1, 2, \ldots, m \quad (20)$$

$$\hat{\mu}_j = \frac{\sum_{i=1}^{N} x_i P_{ij}}{\sum_{i=1}^{N} P_{ij}}, \; j = 1, 2, \ldots, m \quad (21)$$

$$\hat{\sigma}_j = \frac{\sum_{i=1}^{N} P_{ij}(x_i - \hat{\mu}_j)^2}{\sum_{i=1}^{N} P_{ij}}, \; j = 1, 2, \ldots, m \quad (22)$$

where for j=1, 2, . . . , m, i=1, 2, . . . , N, we define $$P_{ij} = \frac{\omega_j G(w_i; \mu_j, \sigma_j)}{p(x_i; \mu, \omega, \sigma)}.$$

With these formulas, we used a fixed number of iterations to set the values $\omega$, $\mu$ and $\sigma$ and denote by $p(\cdot; x)$ our univariate estimate for our data vector $x \in R^N$ by mixture models of Gaussians.

The next step is to iteratively update the orthogonal matrix Y. Our iteration is initialized per our previous discussion of the single Gaussian model. Consequently, all our experiments are performed in d-dimensions where d is chosen to admit a Hadamard matrix. We then modify the eigenvalues of the matrix $V=UU^T$ corresponding to the column vectors $w_1, w_2, \ldots, w_N$ given equation (17) per our discussions of the single gaussian model. Thus, for any vector $Y \in R^d$ and data $x_1, x_2, \ldots, x_N \in R^d$ organized into a d×N matrix X whose columns are $x_1, x_2, \ldots, x_N \in R^d$ we can evaluate the function $$H(y) = H(p(\cdot; X^T y)).$$

Our next task is to iteratively update our orthonormal feature vectors $y_1, y_2, \ldots, y_d$ to enhance our entropy functional (8) which specializes to the form $$\mathcal{F}(Y) = \sum_{j=1}^{d} \mathcal{H}(y_i).$$

To update the vectors we used two dimensional planar rotations. Thus, we choose two consecutive vectors $y_j$, $y_{j+1}$ and form new vectors $$y_l(\theta) = y_l, \; l \neq j, j+1, j=1, 2, \ldots, d, \quad (23)$$

$$y_j(\theta) = y_j \cos\theta - y_{j+1} \sin\theta \quad (24)$$

$$y_{j+1}(\theta) = y_j \sin\theta + y_j \cos\theta \quad (25)$$

$$\ldots, \pi_m, \quad (26)$$

where $\theta \in [0, 2\pi]$. We then optimize the univariate function $$F(\theta) = H(y_j(\theta)) + H(y_{j+1}(\theta))$$

over $\theta \in [0, 2\pi]$ and replace $y_1, y_2, \ldots, y_d$ by $y_1(\hat{\theta}), y_2(\hat{\theta}), \ldots, y_d(\hat{\theta})$ where $\hat{\theta}$ is a good choice for the maximum of the function F. If $j<d-1$, we increment j by one and repeat the procedure; otherwise, we set j=1 and repeat the procedure, cycling several times through the columns of Y. To avoid computing the derivatives of F we compute its values on an acceptably fine grid and choose its largest value.

Feature Selection Using Maximum Likelihood and Parzen Estimators

In the preceding section, we considered modeling our multivariable data by choosing our univariate marginals $p(\cdot; x)$, $x = (x_1, x_2, \ldots, x_N)^T \in R^N$ to be an MLE mixture model of Gaussians.

In this section, we study the possibility of using Parzen estimators for our univariate data and maximum likelihood as a feature selection criterion instead of maximum entropy. Starting with a bin width h and a univariate kernel K, the corresponding Parzen estimator for $x = (x_1, x_2, \ldots, x_N)^T$ is given by $$p(t; x) = \frac{1}{Nh} \sum_{j=1}^{N} \left( K\left(\frac{t - x_j}{h}\right) \right)_i, \; t \in R..$$

In what follows, we choose the kernel K to be the standard Gaussian $K = G(\cdot; 0,1)$. Given d orthonormal vectors $y^1, y^2, \ldots, y^d$ and corresponding marginals $p(\cdot; X^T, y)$, the maximum entropy estimator given by Theorem 1 is $$P^*(x) = \prod_{j=1}^{d} p(y_j^T x; X^T y_j)_i, \; x \in R^d, \quad (26)$$

and the log-likelihood function of the data has the form $$L(Y) := \sum_{i=1}^{N} \sum_{j=1}^{d} \log\left( \frac{1}{Nh} \sum_{k=1}^{N} K(\langle y^j, g^{ik}\rangle) \right)$$

where $$g^{ik} := \frac{x^i - x^k}{h}, \; i, k = 1, 2, \ldots, N.$$

We resort to an EM strategy and develop an iterative update formula that increases L(Y). To this end, we let the matrix $\hat{Y}$ be our initial guess for the desired orthogonal matrix Y and seek another orthogonal matrix Y such that $L(Y) \geq L(\hat{Y})$. To find a suitable Y, we consider the equation $$L(Y) - L(\hat{Y}) = \sum_{i=1}^{N} \sum_{j=1}^{d} \log\left(\sum_{k=1}^{N} c_{kij} a_k\right), \quad (28)$$

where $$a_k = \frac{K(\langle y^j, g^{ik}\rangle)}{K(\langle \hat{y}^j, g^{ik}\rangle)} \quad (29)$$

and $$c_{kij} = \frac{K(\langle \hat{y}^j, g^{ik} h\rangle)}{\sum_{m=1}^{N} K(\langle \hat{y}^j, g^{im} h\rangle)}. \quad (30)$$

Substituting equations (30) and (29) into equation (28) and using the concavity of the log function as well as the form of the kernel K we get $$L(Y) - L(\hat{Y}) \geq \sum_{i=1}^{N} \sum_{j=1}^{d} \sum_{k=1}^{N} c_{kij} \log a_k = Q(Y) - Q(\hat{Y})$$

where $$Q(Y) := -\frac{1}{2} \sum_{j=1}^{d} \langle y^j, A_j y^j \rangle$$

and $$A_j = \sum_{i=1}^{N} \sum_{k=1}^{N} c_{kij} (x^i - x^k)(x^i - x^k)^T.$$

The task is now to compute the maximum of $$\sum_{j=1}^{d} \langle y^j, A_j y^j \rangle$$

over all orthonormal matrices Y. We approach this problem as in the preceding section by using planar rotations. In the case at hand, our angle θ can be determined explicitly. To this end, we consider the function $$F(\theta) = \langle y^1(\theta), A_1 y^1(\theta)\rangle + \langle y^2(\theta), A_2 y^2(\theta)\rangle$$

which simplifies to $$F(\theta) = \alpha \sin 2\theta + \beta \cos 2\theta + \gamma$$

where $$B = \frac{1}{2}(A_1 - A_2),$$

$$C = \frac{1}{2}(A_1 + A_2),$$

$$\alpha = -2\langle y^1, By^2\rangle,$$

$$\beta = \langle y^1, By^1\rangle - \langle y^2, By^2\rangle, \text{ and}$$

$$\gamma = \langle y^1, Cy^1\rangle - \langle y^2, Cy^2\rangle$$

and its minimum occurs at $$\hat{\theta} = k\pi \pm \frac{\psi}{2}$$

where k is an integer and $$\cos\psi = \frac{\alpha}{\sqrt{\alpha^2 + \beta^2}}.$$

Feature Selection Using Maximum Likelihood Gaussian Mixture Extimators

In this section, we discuss optional feature selection for the data $x^1, x^2, \ldots, x^N \in R^d$, the log-likelihood function of interest to us here is $$L(Y, \omega, \mu, \sigma) = \sum_{i=1}^{N} \sum_{j=1}^{d} \log\left(\sum_{l=1}^{m} \omega_{lj} G(\langle y^j, x^i\rangle; \mu_{lj}, \sigma_{lj})\right),$$

where $$\omega_{lj} > 0, \; \sum_{l=1}^{m} \omega_{lj} = 1, \; j = 1, 2, \ldots, d.$$

We describe a method to iteratively increase L. First, we fix Y and point out how to update ω, μ and σ to increase L.

We let the parameters $\hat{\omega}$, $\hat{\mu}$ and $\hat{\sigma}$ be the initial guess. We shall identify ω, μ and σ such that $L(Y, \omega, \mu, \sigma) \geq L(Y, \hat{\omega}, \hat{\mu}, \hat{\sigma})$. To this end, we consider the equation $$L(Y, \omega, \mu, \sigma) - L(Y, \hat{\omega}, \hat{\mu}, \hat{\sigma}) = \sum_{i=1}^{N} \sum_{j=1}^{d} \log\left(\sum_{l=1}^{m} \alpha_{ijl} \beta_{ijl}\right)_i, \quad (31)$$

where $$\alpha_{ijl} = \frac{\hat{\omega}_{lj} G(\langle y^j, x^i\rangle; \hat{\mu}_{lj}, \hat{\sigma}_{lj})}{\sum_{k=1}^{m} \hat{\omega}_{kj} G(\langle y^j, x^i\rangle; \hat{\mu}_{kj}, \hat{\sigma}_{kj})}$$

and $$\beta_{ijl} = \frac{\omega_{lj} G(\langle y^j, x^i\rangle; \mu_{lj}, \sigma_{lj})}{\hat{\omega}_{lj} (G(\langle y^j, x^i\rangle; \hat{\mu}_{lj}, \hat{\sigma}_{lj}))_i}.$$

Note that, by definition, $$\sum_{l=1}^{m} \alpha_{ijl} = 1.$$

Thus, using the concavity of the log function in equation (29) we obtain $$L(Y, \omega, \mu, \sigma) - L(Y, \hat{\omega}, \hat{\mu}, \hat{\sigma}) \geq \sum_{i=1}^{N} \sum_{j=1}^{d} \sum_{l=1}^{m} \alpha_{ijl} \log \beta_{ijl} =$$

$$Q(Y, \omega, \mu, \sigma) - Q(Y, \hat{\omega}, \hat{\mu}, \hat{\sigma}),$$

where $$Q(Y, \omega, \mu, \sigma) = \sum_{i=1}^{N} \sum_{j=1}^{d} \sum_{l=1}^{m} \alpha_{ijl} \log(\omega_{lj} G(\langle y^j, x^i \rangle; \mu_{lj}, \sigma_{lj})).$$

We can explicitly maximize $Q(Y,\omega,\mu,\sigma)$ with respect to $\omega, \mu, \sigma$ to get the equations $$\omega_{lj} = \frac{1}{N} \sum_{i=1}^{N} \alpha_{ijl},$$

$$\mu_{lj} = \frac{\sum_{i=1}^{N} \alpha_{ijl} \langle y^j, x^i \rangle}{\sum_{i=1}^{N} \alpha_{ijl}}$$

and $$\sigma_{lj} = \frac{\sum_{i=1}^{N} (\alpha_{ijl}(\langle y^j, x^i \rangle - \mu_{lj}))^2}{\sum_{i=1}^{N} \alpha}$$

These formulas provide an effective means for updating the parameters $\omega$, $\mu$ and $\sigma$. We will now consider an update formula for Y. To this end, we use the new parameters $\omega$, $\mu$ and $\sigma$ for this step and reformulate the log-likelihood function in terms of unique vectors $\mu^l$, $l=1, 2, \ldots, m$, defined by the equation $\mu_{jl} = \langle y^j, \mu^l \rangle$ $$\log L(Y, \omega, \mu, \sigma) = \sum_{i=1}^{N} \sum_{j=1}^{d} \log \left( \sum_{l=1}^{m} \omega_{lj} G(\langle y^j, x^i \rangle; \langle y^j, \mu^l \rangle, \sigma_{lj}) \right).$$

Suppose that $\hat{Y}$ is our initial choice. We seek an orthogonal matrix Y such that $L(Y,\omega,\mu,\sigma) \geq L(\hat{Y},\omega,\mu,\sigma)$. Similar to the argument used before, we have that $$\log L(Y, \omega, \mu, \sigma) - \log L(\hat{Y}, \omega, \mu, \sigma) \geq \sum_{i=1}^{N} \sum_{j=1}^{d} \sum_{l=1}^{m} \alpha_{ijl} \log \beta_{ijl},$$

where $$\alpha_{ijl} = \frac{\omega_{lj} G(\langle \hat{y}^j, x^i \rangle; \langle \hat{y}^j, \mu^l \rangle, \sigma_{lj})}{\sum_{k=1}^{m} \omega_{kj} G(\langle \hat{y}^j, x^i \rangle; \langle \hat{y}^j, \mu^k \rangle, \sigma_{kj})},$$

and $$\beta_{ijl} = \frac{\omega_{lj} G(\langle y^j, x^i \rangle; \langle y^j, \mu^l \rangle, \sigma_{lj})}{\omega_{lj} G(\langle \hat{y}^j, x^i \rangle; \langle \hat{y}^j, \mu^l \rangle, \sigma_{lj})}.$$

Hence, we conclude that $L(Y,\omega,\mu,\sigma) - L(\hat{Y},\omega,\mu,\sigma) \geq Q(Y,\omega,\mu,\sigma) - Q(\hat{Y},\omega,\mu,\sigma)$ where $$Q(Y, \omega, \mu, \sigma) = \sum_{i=1}^{N} \sum_{j=1}^{d} \sum_{l=1}^{m} \alpha_{ijl} \log(\omega_{lj} G(\langle y^j, x^i \rangle; \langle y^j, \mu^l \rangle, \sigma_{lj}))$$

$$= \frac{1}{2} \sum_{j=1}^{d} \langle y^j, A^j_{jy} \rangle + Q_C$$

with $$A_j = \sum_{i=1}^{N} \sum_{l=1}^{m} \frac{\alpha_{ijl}}{\sigma_{lj}} (x_i - \mu_l)(x_i - \mu_l)^T$$

and $$Q_C = \sum_{i=1}^{N} \sum_{j=1}^{d} \sum_{l=1}^{m} \alpha_{ijl} \log \left( \frac{\omega_{lj}}{\sqrt{\sigma_{lj}}} \right).$$

Since $Q_c$ is independent of Y, we can use the methods described above to increase the function Q.

Applications in Speech Recognition

From a practical standpoint, estimation of densities in speech data is accompanied by all the difficulties characteristic of high dimensional density estimation problems. Feature vectors of dimension fifty or more are typical in speech recognition systems, and consequently, the data can be considered to be highly sparse. In contrast, the literature on multivariate density estimation puts high emphasis on "exploratory data analysis", the goal of which is to glean insight about the densities via visualization of the data. This is not feasible for dimensions of the order of fifty or more, even when projections on lower dimensional spaces are considered.

While the use of linear discriminant analysis to reduce the dimension of the feature set is classically known (see, e.g., Frederick Jelenik, *Statistical Methods for Speech Recognition*, MIT Press (1997) and Nagendra Kumar, "Investigation of silicon auditory model and generalization of linear discriminant analysis for improved speech recognition", Ph.D dissertation, Johns Hopkins University, 1997), the idea of reconstructing the high dimensional density from lower dimensional projections as well as the use of maximum entropy and maximum likelihood criterion to optimize the directions of projection is novel for this purpose.

Referring now to FIG. 1 of the drawings, there is shown a flow diagram of the logic which implements the process of the invention. Density estimates are input at 101. In function block 102, speech data $x^i$, i=1,2, . . . ,N, is retrieved before entering a processing loop. Function block 103 is the first block in the processing loop. Data is projected; i.e., $y^i = Ax^i$. Then, in function block 104, one-dimensional density estimates are computed for $y_j^i$. At this point, processing method calls are made at block 105. The first method called is the Gaussian mixture EM method in function block 106, shown in more detail in FIG. 2. The second method called is the Parzen estimator EM method in function block 107, shown in more detail in FIG. 3. When these methods have completed, A is optimized in function block 108, shown in more detail in FIG. 4. Next, criteria method calls are made at block 109. The first method called is the maximum likelihood method in function block 110. The second method called is the maximum entropy method in function block 111. In decision block 112, a determination is made as to whether convergence has been obtained and, if not, the process loops back to function block 103; otherwise, the process has completed and a return 113 is made to the main program.

Figure 2:
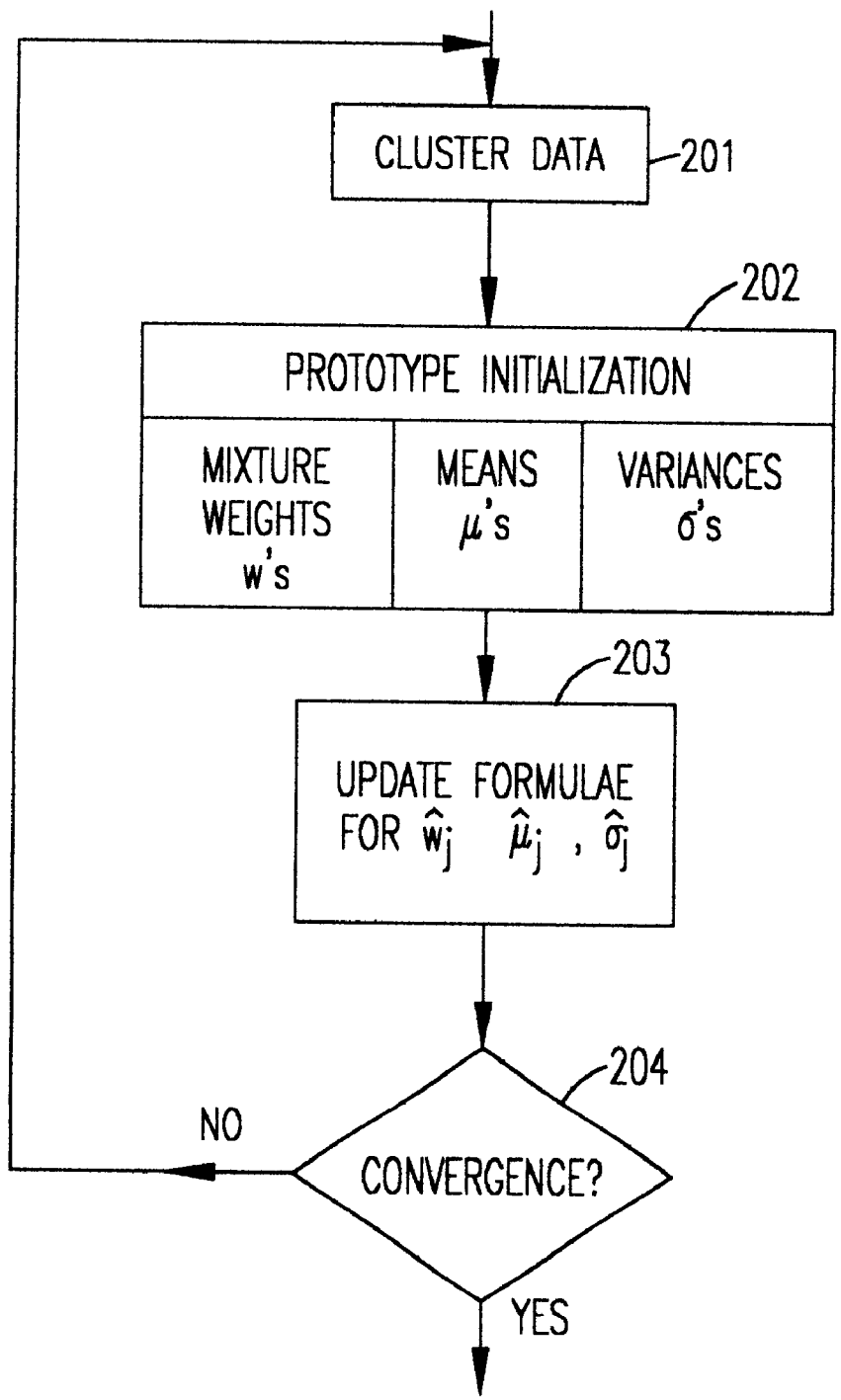
FIG. 2 is a flow diagram showing in more detail the process of block 106 in FIG. 1.

FIG. 2 shows in more detail the process Gaussian mixture EM method in function block 106. Cluster data is received at function block 201, and prototype initialization is performed in function block 202, in which mixture weights $\omega$, means $\mu$ and variances $\sigma$ are computed. The formulas for $\hat{\omega}_j$, $\hat{\mu}_j$ and $\hat{\sigma}_j$ are updated in function block 203 using formulas (20), (21) and (22). A determination is made in decision block 204 as to whether a convergence is detected. If not, the process loops back to function block 201 to iteratively repeat the process. When convergence is detected, a return is made to the main process.

Figure 3:
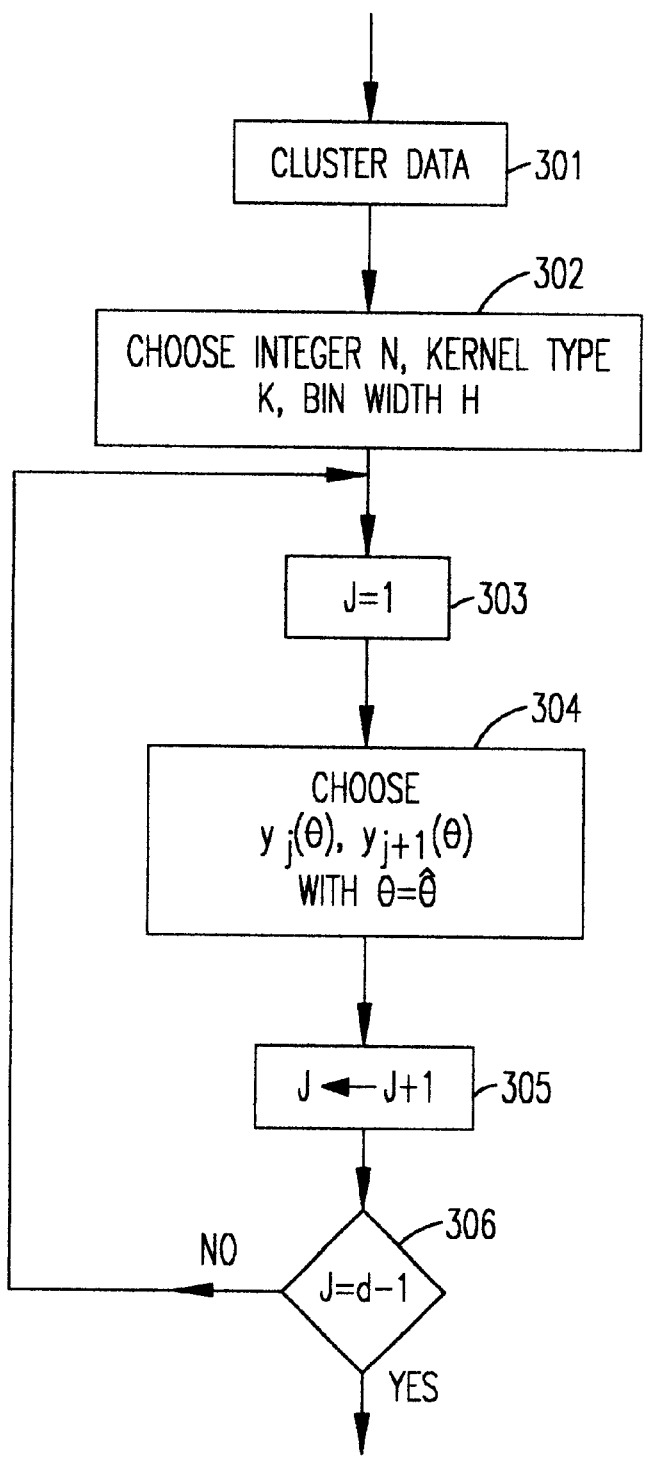
FIG. 3 is a flow diagram showing in more detail the process of block 107 in FIG. 1.

FIG. 3 shows in more detail the Parzen estimator EM method in function block 107. Cluster data in input at function block 301. An integer N, kernel type K and bin width h are chosen for equation (28) in function block 302. The index j is initialized to 1 in function block 303. Then in function block 304, $y_j(\theta)$ and $y_{j+1}(\theta)$ are chosen as in equations (23) and (24) with $\theta=\hat{\theta}$. The index j is incremented by 1 in function block 305, and then a determination is made in decision block 306 as to whether j=d−1. If not, the process loops back to function block 303, but if so, a return is made to the main program.

Figure 4:
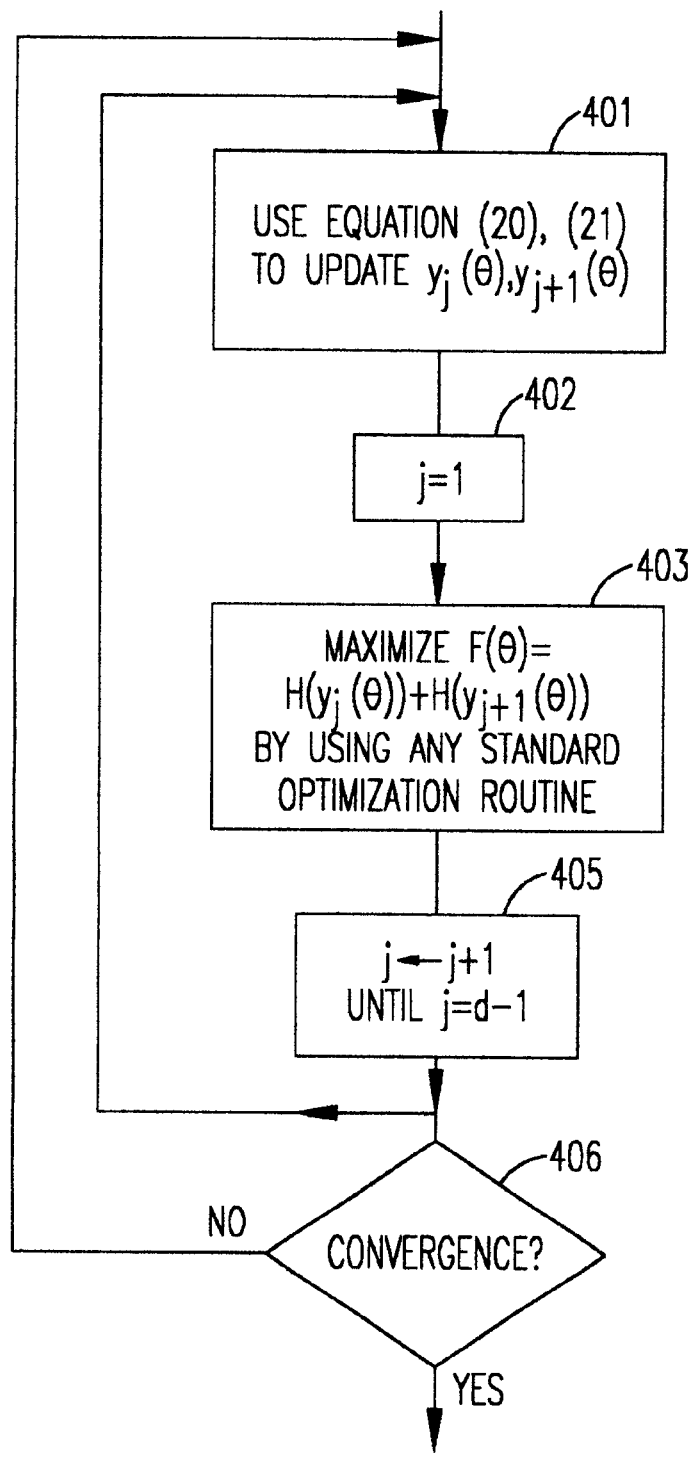
FIG. 4 is a flow diagram showing in more detail the process of block 108 in FIG. 1.

FIG. 4 shows in more detail the optimization of A in function block 108. The process is entered at function block 401 where equations (20) and (21) are used to update $y_j(\theta)$ and $y_{j+1}(\theta)$ using equations (23) and (24). The index j is initialized to 1 in function block 402. The equation $F(\theta)=H(y_j(\theta))+H(y_{j+1}(\theta))$ is maximized in function block 403 using any standard optimization routine. The index j is incremented by 1 in function block 404 and the process loops back to function block 401. This iteration continues until j=d−1 in block 405, at which point a determination is made in decision block 406 as to whether a convergence is detected. If not, the process loops back to function block 401. When convergence is detected, the process makes a return to the main routine.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of high dimensional density estimation and feature extraction from multivariate data in speech recognition where the number of directions is the same as the dimension of sampled data comprising the steps of:

projecting the multivariate data on chosen directions;

reconstructing a univariate probability density from the projected data for each choice of directions; and using the univariate probability densities to reconstruct an unknown multivariate density.

2. The method of high dimensional density estimation and feature extraction from multivariate data in speech recognition recited in claim 1, wherein the univariate probability densities are reconstructed by a maximum entropy criterion.

3. The method of high dimensional density estimation and feature extraction from multivariate data in speech recognition recited in claim 1, wherein the univariate probability densities are reconstructed by a maximum likelihood criterion.

4. The method of high dimensional density estimation and feature extraction from multivariate data in speech recognition recited in claim 1, further comprising the step of choosing directions for projecting the multivariate data using an iterative numerical algorithm for estimating multivariate density and computing directions for projections via rotational transformations when the univariate densities are mixtures of Gaussians.

5. The method of high dimensional density estimation and feature extraction from multivariate data in speech recognition recited in claim 4, wherein the univariate probability densities are reconstructed by a maximum entropy criterion.

6. The method of high dimensional density estimation and feature extraction from multivariate data in speech recognition recited in claim 4, wherein the univariate probability densities are reconstructed by a maximum likelihood criterion.

7. The method of high dimensional density estimation and feature extraction from multivariate data in speech recognition recited in claim 1, further comprising the step of choosing directions for projecting the multivariate data using an iterative numerical algorithm for estimating multivariate density and computing directions for projections via rotational transformations when the univariate densities are Parzen density estimators.

8. The method of high dimensional density estimation and feature extraction from multivariate data in speech recognition recited in claim 7, wherein the univariate probability densities are reconstructed by a maximum entropy criterion.

9. The method of high dimensional density estimation and feature extraction from multivariate data in speech recognition recited in claim 7, wherein the univariate probability densities are reconstructed by a maximum likelihood criterion.

* * * * *